(12) United States Patent
Holloway et al.

(10) Patent No.: US 6,739,633 B2
(45) Date of Patent: May 25, 2004

(54) FUEL DOOR LOCK ACTUATOR

(75) Inventors: John C. Holloway, Cumberland, RI (US); Thomas P. Schregardus, Somerville, MA (US); Henry C. Ruff, Mattapan, MA (US); Eric C. Beishline, Marlborough, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 0 days.

(21) Appl. No.: 09/898,579

(22) Filed: Jul. 3, 2001

(65) Prior Publication Data

US 2002/0089187 A1 Jul. 11, 2002

Related U.S. Application Data

(60) Provisional application No. 60/215,904, filed on Jul. 3, 2000.

(51) Int. Cl.$^7$ ................................................ E05C 3/06
(52) U.S. Cl. ........................... 292/199; 292/DIG. 4; 292/DIG. 23; 292/201; 292/144
(58) Field of Search ................. 70/256, 279.1, 70/278.7, 282, 154; 272/201, 216, 279, 175, 144, 121, 128, DIG. 4, DIG. 23, 199

(56) References Cited

U.S. PATENT DOCUMENTS

| | | | | |
|---|---|---|---|---|
| 3,332,713 A | * | 7/1967 | DeClaire et al. ............... 493/61 |
| 3,947,060 A | * | 3/1976 | Zimmer et al. ............... 292/142 |
| 4,290,634 A | * | 9/1981 | Gelhard ....................... 292/201 |
| 4,494,782 A | * | 1/1985 | Lutz ............................. 292/96 |
| 4,519,227 A | * | 5/1985 | Dumbser et al. .............. 70/264 |
| 4,674,781 A | * | 6/1987 | Reece et al. ............... 292/336.3 |
| 4,702,117 A | * | 10/1987 | Tsutsumi et al. ........... 74/89.17 |
| 4,727,301 A | * | 2/1988 | Fulks et al. .................. 318/468 |
| 5,066,062 A | * | 11/1991 | Sekulovski ................. 296/97.22 |
| 5,076,622 A | * | 12/1991 | Detweiler .................... 292/201 |
| 5,088,347 A | * | 2/1992 | Wanlass ....................... 74/625 |
| 5,114,197 A | * | 5/1992 | Persiani ..................... 292/336.3 |
| 5,148,691 A | * | 9/1992 | Wallden ..................... 70/279.1 |
| 5,232,253 A | * | 8/1993 | Tamiya ....................... 292/201 |
| 5,280,881 A | * | 1/1994 | Karmin ..................... 70/279.1 |
| 5,544,508 A | * | 8/1996 | Torkowski .................. 70/264 |
| 5,702,136 A | | 12/1997 | Funk et al. ................ 292/336.3 |
| 5,715,713 A | * | 2/1998 | Aubry et al. ................. 70/277 |
| 5,772,275 A | * | 6/1998 | Tokarz ........................ 296/121 |
| 5,802,894 A | * | 9/1998 | Jahrsetz et al. ............... 70/264 |
| 6,199,923 B1 | * | 3/2001 | Rice et al. ................... 292/216 |
| 6,276,743 B1 | | 8/2001 | Jyawook et al. ............. 296/155 |
| 6,318,771 B1 | * | 11/2001 | Holloway et al. ....... 292/341.16 |

* cited by examiner

*Primary Examiner*—Robert J. Sandy
*Assistant Examiner*—Dinesh Melwani
(74) *Attorney, Agent, or Firm*—Grossman, Tucker, Perreault & Pfleger, PLLC

(57) ABSTRACT

A fuel filler door actuator including a motor, a gear train coupled to the motor and to a latch arm, and a locking cam coupled to the gear train. The locking cam resists movement of the latch arm from an unlocked condition to a locked condition. A manual override cable is disclosed for manually moving the latch arm from the locked condition to an unlocked condition. A push—push mechanism is disclosed for allowing facile opening of a fuel filler door, and a quick connect/disconnect feature is disclosed for allowing facile assembly of the actuator to a fuel filler door housing.

17 Claims, 9 Drawing Sheets

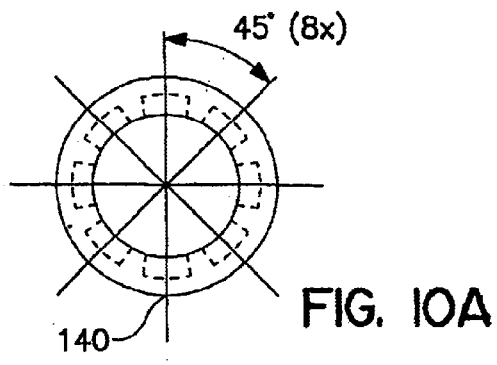
FIG. 10A
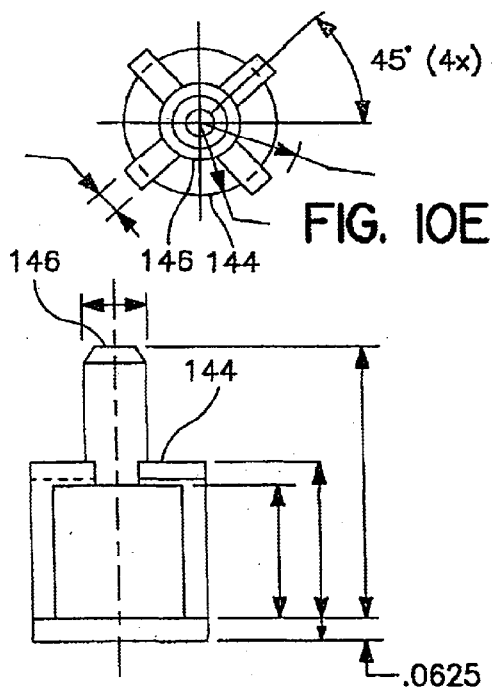
FIG. 10E
FIG. 10D
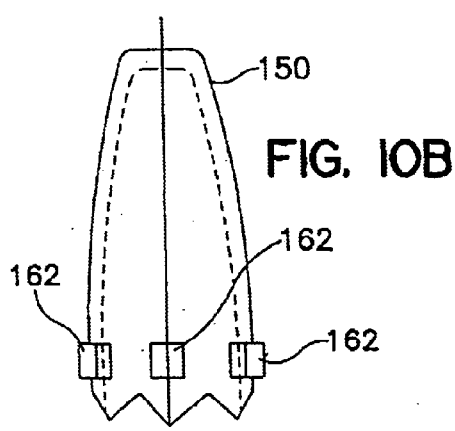
FIG. 10C
FIG. 10B
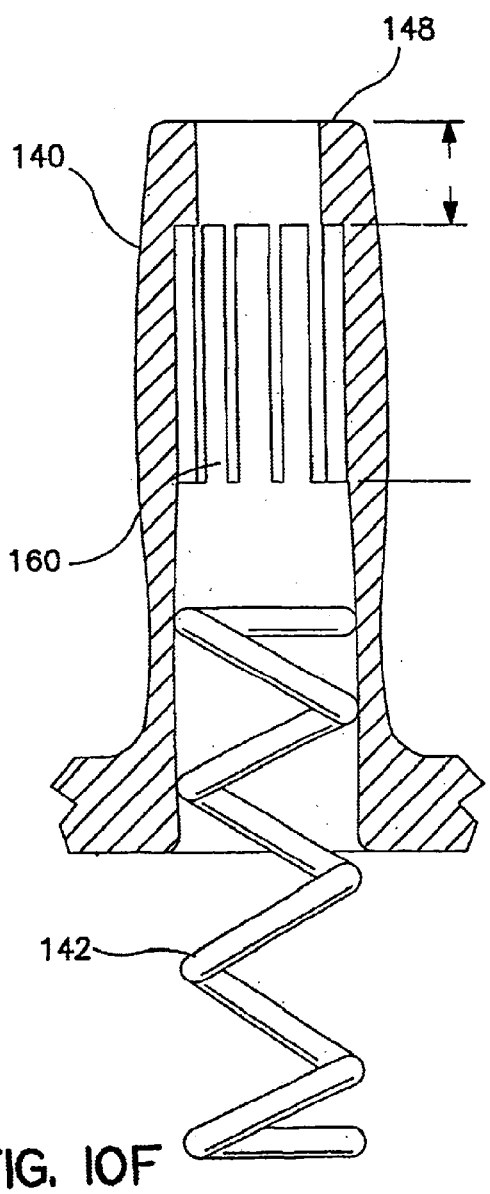
FIG. 10F

FUEL DOOR LOCK ACTUATOR

CROSS REFERENCE TO RELATED APPLICATIONS

This application claims the benefit of the filing date of U.S. Provisional Application Ser. No. 60/215,904 filed Jul. 3, 2000, the teachings of which are incorporated herein by reference.

FIELD OF THE INVENTION

The present invention relates in general to actuator devices, and more particularly, to a door lock actuator useful, for example, in connection with automotive fuel doors.

BACKGROUND OF THE INVENTION

In an effort to inhibit unauthorized access to a vehicle's fuel tank, automobile manufacturers have evaluated various fuel filler door latch systems. Conventionally, fuel filler door latch systems have included the use of a striker fixed to the filler door and a latch member ("hook") mounted to the vehicle body. The latch member engages the striker to lock the fuel filler door in a "latched" position. To release the fuel filler door, the latch member is moved to an "unlatched" position to disengage the striker. The fuel filler door is spring loaded to open partially when the latch member moves to the "unlatched" position for allowing the operator to pivot the door to a full open position.

One method of locking the fuel filler door includes the use of a key lock mechanism. However, as a convenience option, vehicle manufacturers are installing remotely actuated fuel filler door latch release systems. Such remotely actuated systems permit an occupant within the passenger compartment of the vehicle to release the fuel filler door prior to exiting the vehicle. Typically, remotely actuated latching systems include the use of linear actuation cables or linkages for manually releasing the filler door. In general, a vehicle occupant pulls a release handle within the passenger compartment to move the latch member out of engagement with the striker. As an alternative, many vehicles are now being equipped with electrically actuated release systems. Electrically actuated systems include a solenoid device mounted remote from the fuel filler area and a linkage coupled between a movable solenoid armature and the latch member. Energization of the solenoid moves the armature and, consequently, the latch member to disengage the striker.

Because the fuel filler door is a cosmetic "fit and finish" component of an automobile, it must be precisely aligned during assembly. It is common for conventional fuel filler latching mechanisms to require adjustment of the alignment between the latch member and the striker following vehicle assembly to assure the release system will function properly.

A disadvantage associated with known solenoid operated fuel filler latching mechanisms is the excessive armature travel required to assure adequate system reliability. Conventional solenoid actuated release systems must generate a large armature travel to account for the dimensional variations associated with the components making up a fuel filler door assembly and the latch mechanism. As is known in solenoid design, it is an inherent characteristic that the magnetic attractive force produced by a solenoid device decreases as its armature travel increases. Therefore, to assure release of the striker it has been necessary to provide an extremely large and expensive solenoid to generate a sufficient force output with a sufficiently large travel. Consequently, solenoid actuated fuel filler door latch systems have, until recently, been extremely expensive due to large solenoid requirements to account for dimensional and alignment variations.

Accordingly, there is a need in the art for a fuel filler door actuator that efficiently and reliably establishes the lock state of a fuel filler door while overcoming the deficiencies of conventional latch mechanisms.

SUMMARY OF THE INVENTION

According to one aspect of the invention, there is provided a fuel filler door actuator including: a motor; a gear train coupled to the motor and to a latch arm for moving the latch arm between locked and unlocked conditions upon energization of the motor in first and second directions, respectively; and a locking cam coupled to the gear train for resisting movement of the latch arm from the unlocked condition to the locked condition. A manual override cable may be provided for manually moving the latch arm from the locked condition to an unlocked condition. An actuator consistent with the invention may also include a push—push mechanism for allowing facile opening of a fuel filler door, and may include a quick connect/disconnect feature for allowing facile assembly of the actuator to a fuel filler door housing.

BRIEF DESCRIPTION OF THE DRAWING

For a better understanding of the present invention, together with other objects, features and advantages, reference should be made to the following detailed description which should be read in conjunction with the following figures wherein like numerals represent like parts:

FIGS. 10A–10F: are views of constituent parts of an exemplary push—push mechanism useful in connection with the present invention;

DETAILED DESCRIPTION

Figure 1:
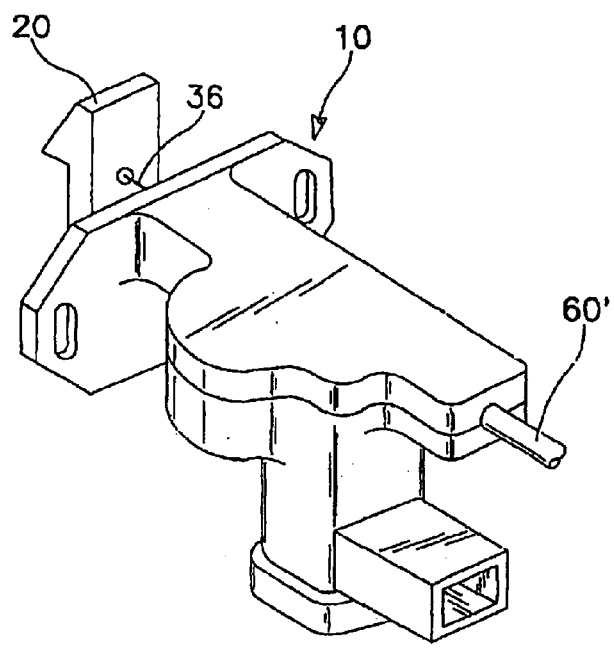
FIG. 1: is a perspective view of an exemplary actuator consistent with the invention.
Figure 2:
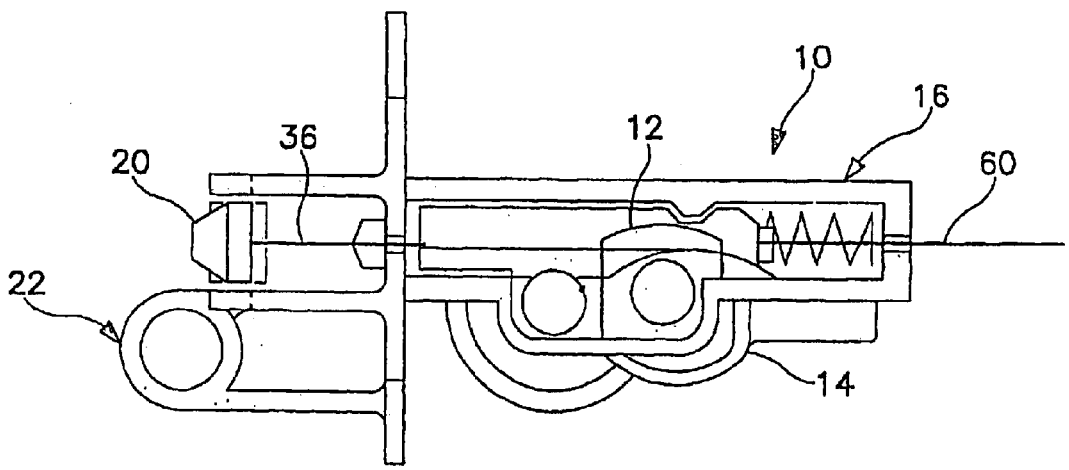
FIG. 2: is a top plan view of another exemplary actuator consistent with the invention.

Turning now to FIGS. 1 and 2 there is shown perspective and top views, respectively, of an exemplary actuator 10 consistent with the invention. In general, the actuator 10 includes a DC motor 12 disposed in a motor casing portion 14 of the actuator housing 16 for driving a gear train 18 (FIG. 3) which is operative to cause pivoting motion of the latch arm 20 to cause engagement and disengagement of a feature, e.g. a striker, on a door such as a fuel filler door. As shown particularly in FIG. 2, a push—push door mechanism 22 may be mounted on the housing 16 for allowing facile opening and closing of the door.

Figure 3:
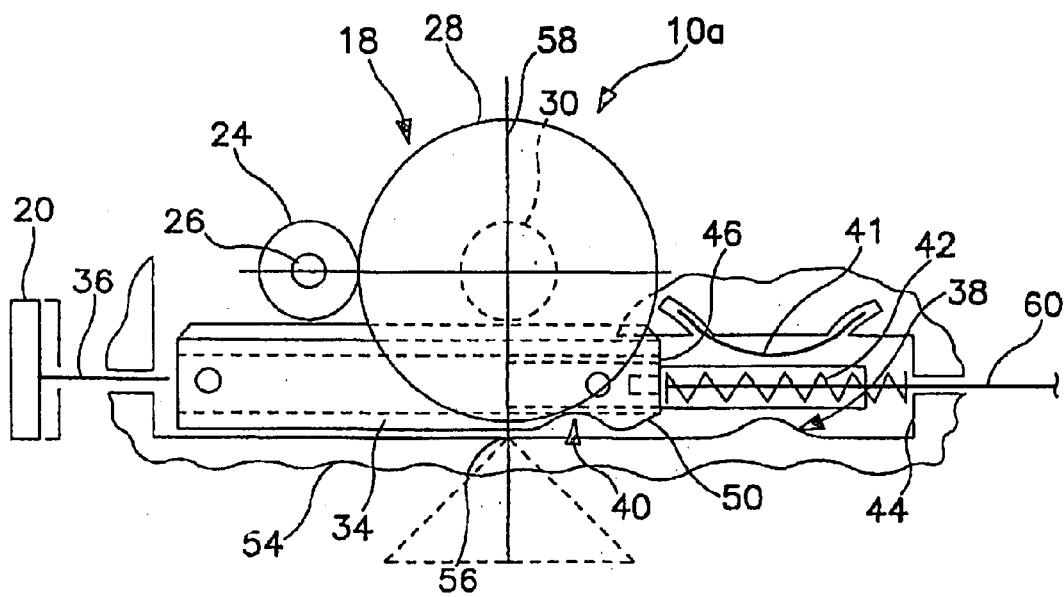
FIG. 3: is a partial sectional and plan view of a portion of an exemplary actuator consistent with the invention.
Figure 4:
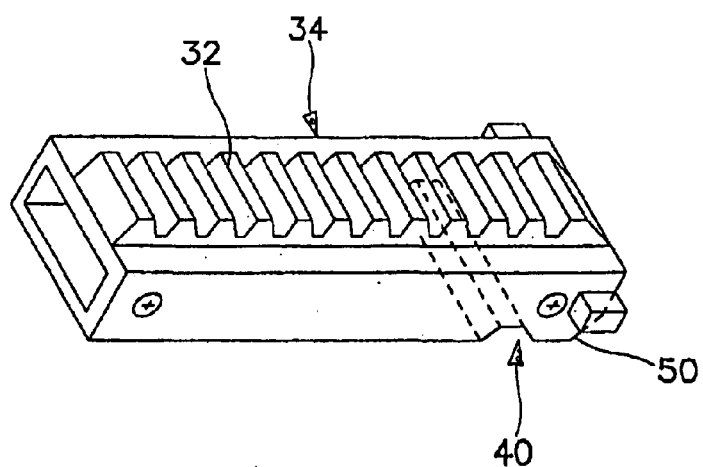
FIG. 4: is a perspective view of the rack illustrated in FIG. 3.

In FIGS. 3 and 4, there is shown a partial top cutaway view of an actuator 10a consistent with the invention illustrating an exemplary gear train 18. In the illustrated embodiment, a pinion gear 24 is mounted on the motor output shaft 26 for driving a compound spur gear 28. A pinion 30 on the spur gear is in meshing engagement with corresponding teeth 32 on a rack 34. The forward end of the rack is secured to a top portion of the latch arm 20 by a rigid member 36 so that translation of the rack 34 causes corresponding motion in the latch arm. Clockwise rotation of the spur gear 28 causes motion of the rack 34 in the direction of the latch arm 20, i.e. for causing a "lock condition." Counterclockwise rotation of the spur gear causes translation of the rack in a direction away from the latch arm for causing an unlocked condition.

Advantageously, a locking cam 38 is provided on the side surface of the housing for mating engagement with a corresponding detent notch 40 in the side surface of the rack when the rack is in an unlocked position. A compression spring 42 has a first end disposed against the end 46 of the rack and a second end disposed against an abutment surface 44 in the housing for biasing in the direction towards the latch, i.e. in the latch open position.

In operation, the motor 12 is energized to drive the spur gear and cause corresponding translation of the rack 34 to achieve either a "locked" or "unlocked" condition. In the illustrated embodiment, when the spur gear is driven in a clockwise direction, the rack is driven to pull the latch into an "unlocked" position with the rack 34 traveling toward the rear of the housing against the bias of the spring 42. As a cam engagement surface 50 on the rack engages the front surface of the cam 38, the rack is forced upward with the side surface thereof engaging a leaf spring 52. The leaf spring 52 forces the rack downwardly against the cam 38. The rack is driven over the cam until the cam mates with the detent notch 40 in the side surface of the rack, locking the rack in the "unlocked" position.

To move to the "locked" position, the motor is energized in an opposite direction to cause counter-clockwise rotation of the spur gear 28 and corresponding movement of the rack in the direction of the latch arm 20. In this direction of movement, the rear surface of the detent notch 40 contacts the rear side of the cam 38 thereby forcing the end of the rack upward against the bias of the leaf spring 52. Meanwhile the front of the rack pivots towards the side surface 54 of the housing about a pivot point 56 positioned slightly toward the rear of the center axis 58 of the spur gear, while maintaining a positive gear mesh between the pinion 30 on the spur gear and the rack teeth 32. When the cam 38 escapes the detent notch in the forward direction, the rack moves fully forward in the direction of the latch 20 under the force of the motor and the bias of the compression spring 42, thereby causing pivoting of the latch 20 in the forward direction to achieve a "locked" condition.

In the illustrated exemplary embodiment, a manual override cable 60 is affixed to the rear of the rack to facilitate unlocking of a door in the event of a loss of electrical power. An end of the cable 60 may be accessible to a vehicle operator at a remote location, e.g. in an automobile glove box, trunk etc. To operate the manual override, an operator may apply a force to the manual override cable 60 to draw the rack toward the rear portion of the housing until the cam and the detent notch are in mating engagement. In this position, the rack is detented into the "unlocked" position.

Figure 5:
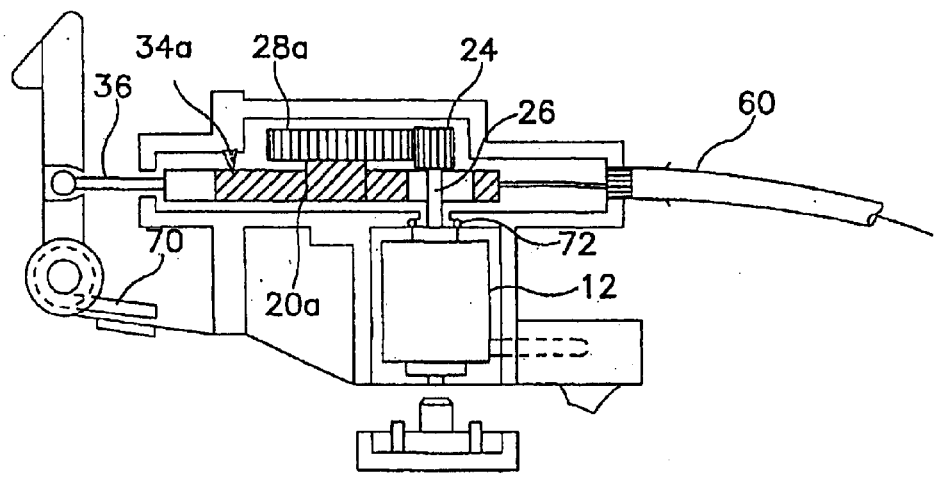
FIG. 5: is a side sectional view of another exemplary actuator consistent with the invention.

In the side sectional view of FIG. 5, there is illustrated another embodiment of an actuator consistent with the invention wherein the motor 12 and pinion 28a are positioned toward the rear of the housing, as opposed to the front of the housing as illustrated in FIG. 3. Also, the pinion 30a on the compound gear and the rack are shown having helical teeth, and a torsion spring 70 is provided at the mounting of the latch 20 to provide a forward, i.e. locking position, bias to the latch, thereby obviating the need for compression spring 42. Those skilled in the art will recognize other configurations for achieving the advantages of the present invention. It is to be understood, therefore, that that exemplary embodiments illustrated herein are provided by way of illustration, but not of limitation.

Advantageously, in a door lock actuator consistent with the invention, "locked" and "unlocked" conditions for the latch may be achieved reliably using a minimal number of parts. This leads to obvious efficiencies in assembly and cost. Also, the mechanism is effectively detented into an unlocked condition, and an efficient manual override is provided in the event of lost power. For safety, the motor 12 is disposed in a separate case and sealed therein by O-rings 72, as shown for example in FIG. 5.

Figure 6:
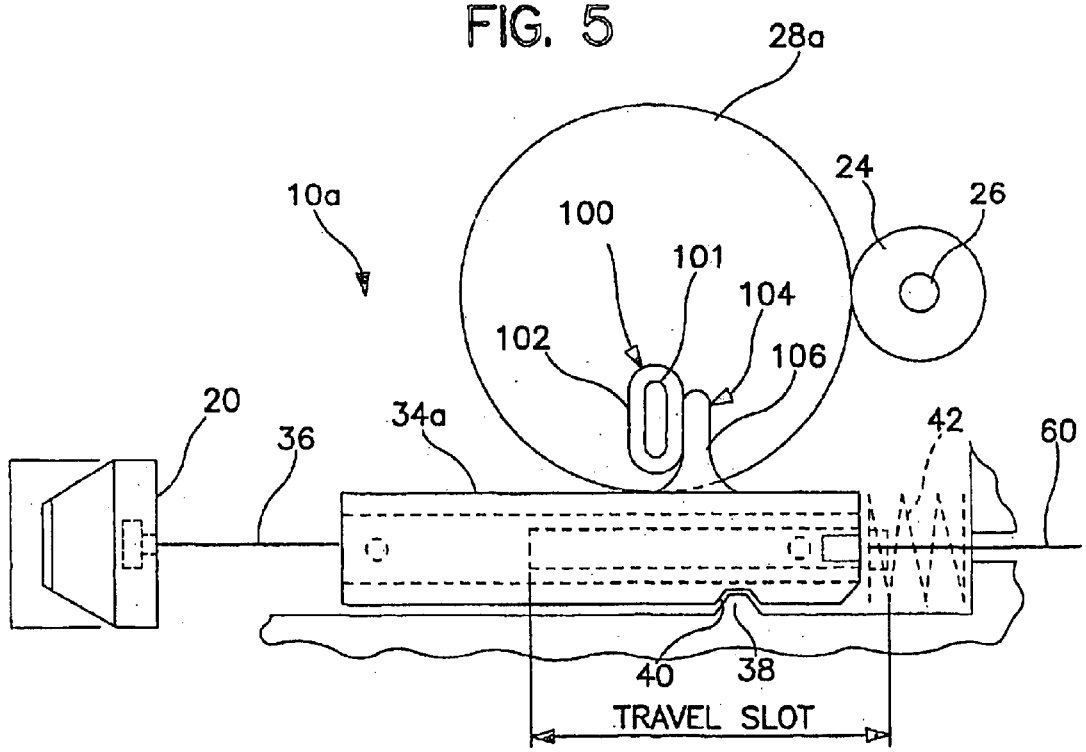
FIG. 6: is a partial sectional and plan view of a portion of another exemplary actuator consistent with the invention.
Figure 7:
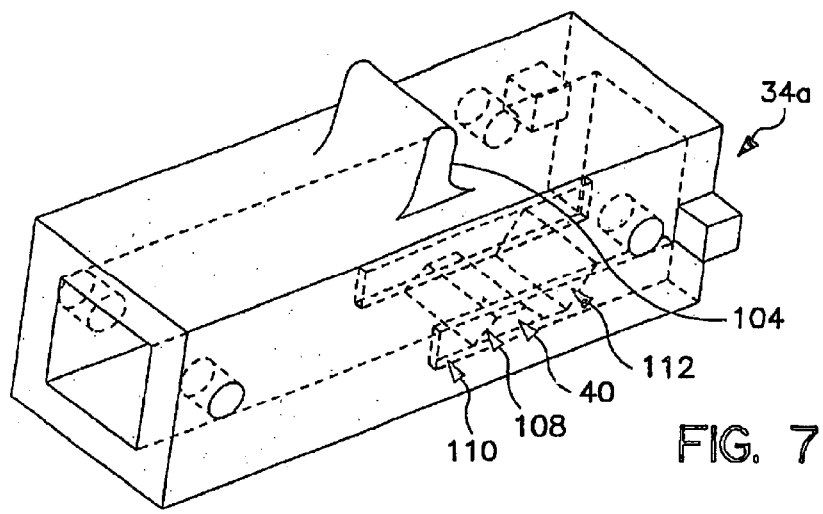
FIG. 7: is a perspective plan view of the rack illustrated in FIG. 6.

Turning now to FIGS. 6 and 7, there is shown another exemplary embodiment 10a of a door lock actuator consistent with the invention. As shown, the exemplary actuator 10a includes a spur gear 28a driven by a pinion 24 on a motor output shaft 26. The spur gear includes a paddle 100 disposed on the perimeter thereof. In the illustrated embodiment, the paddle includes an inner rigid portion 101 and a shock absorber 102.

The paddle on the spur gear is positioned for contacting an extended tooth 104 or tab on the rack 34a. The actuator 10a operates in substantially the same manner as the embodiment 10, described above, except that linear motion of the rack is caused by contact of the paddle 100 with the tooth. In particular, from the "unlocked" position illustrated in FIG. 6, the motor may rotate the spur gear 28a in a clockwise direction. Due to the positioning of the paddle 100 away from the side 106 of the tooth, the motor has an opportunity bring the spur gear 28a to full rotational speed before the shock absorber impacts the side 106 of the tooth.

On impact of the paddle with side 106 the tooth, the paddle drives the rack 34 forward to disengage the mating relationship of the cam 38 with the detent notch 40. The spring 42 assists the motion of the rack in toward the latch arm, and the latch arm is driven forward to a "locked"

position. To return to the unlocked position, the motor is operated in the opposite direction to drive the spur gear in a counterclockwise direction. Again the paddle 100 contacts the tooth 104 and the rack is driven away from the latch arm 20 with the detent notch 40 moving into mating engagement with the cam 38.

FIG. 7 illustrates the rack 34a. As shown the detent notch 40 may be defined by a snap leg 108 on the interior of the rack. The snap leg has a forward end 110 affixed to the rack, and a rearward end 112 that is free to move upward with a spring action. The rearward end 112 thus moves upward upon engagement with the cam 38 to allow the detent notch 40 to move over the detent in the "unlocked" position.

Figure 8:
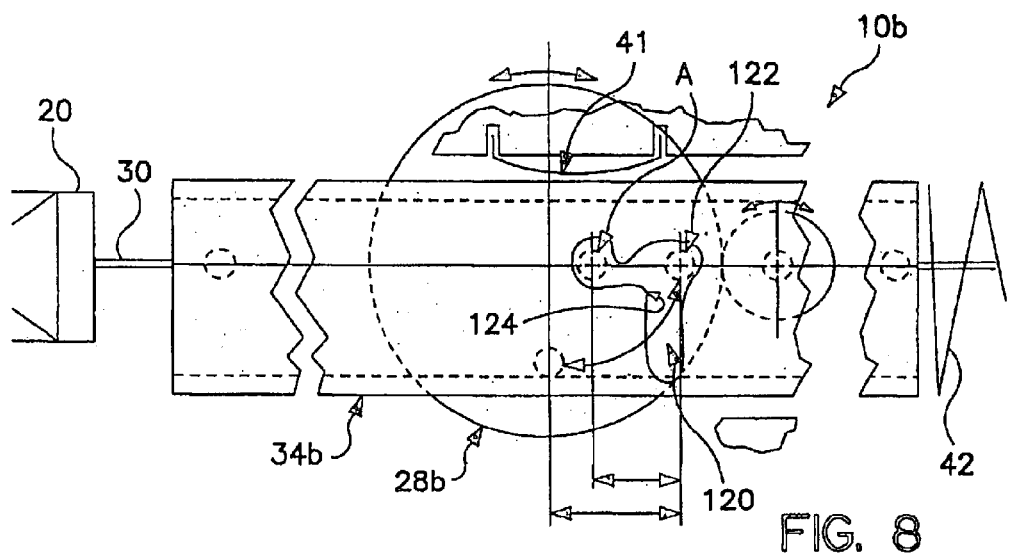
FIG. 8: is a partial sectional and plan view of a portion of yet another exemplary actuator consistent with the invention.
Figure 9:
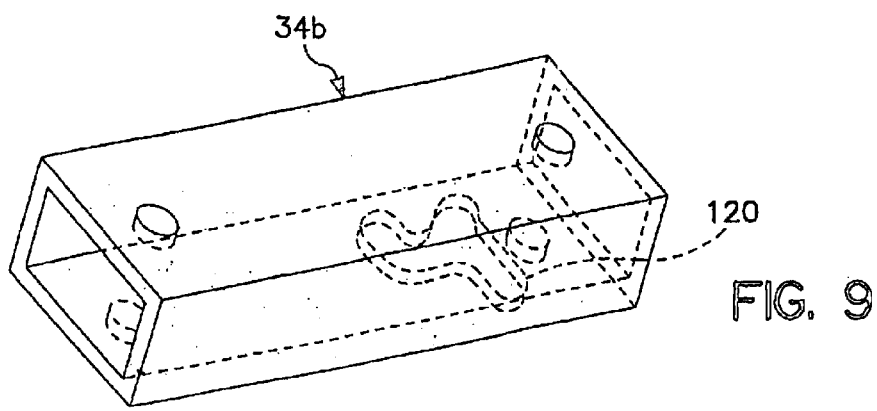
FIG. 9: is a perspective plan view of the rack illustrated in FIG. 8.
Figure 11:
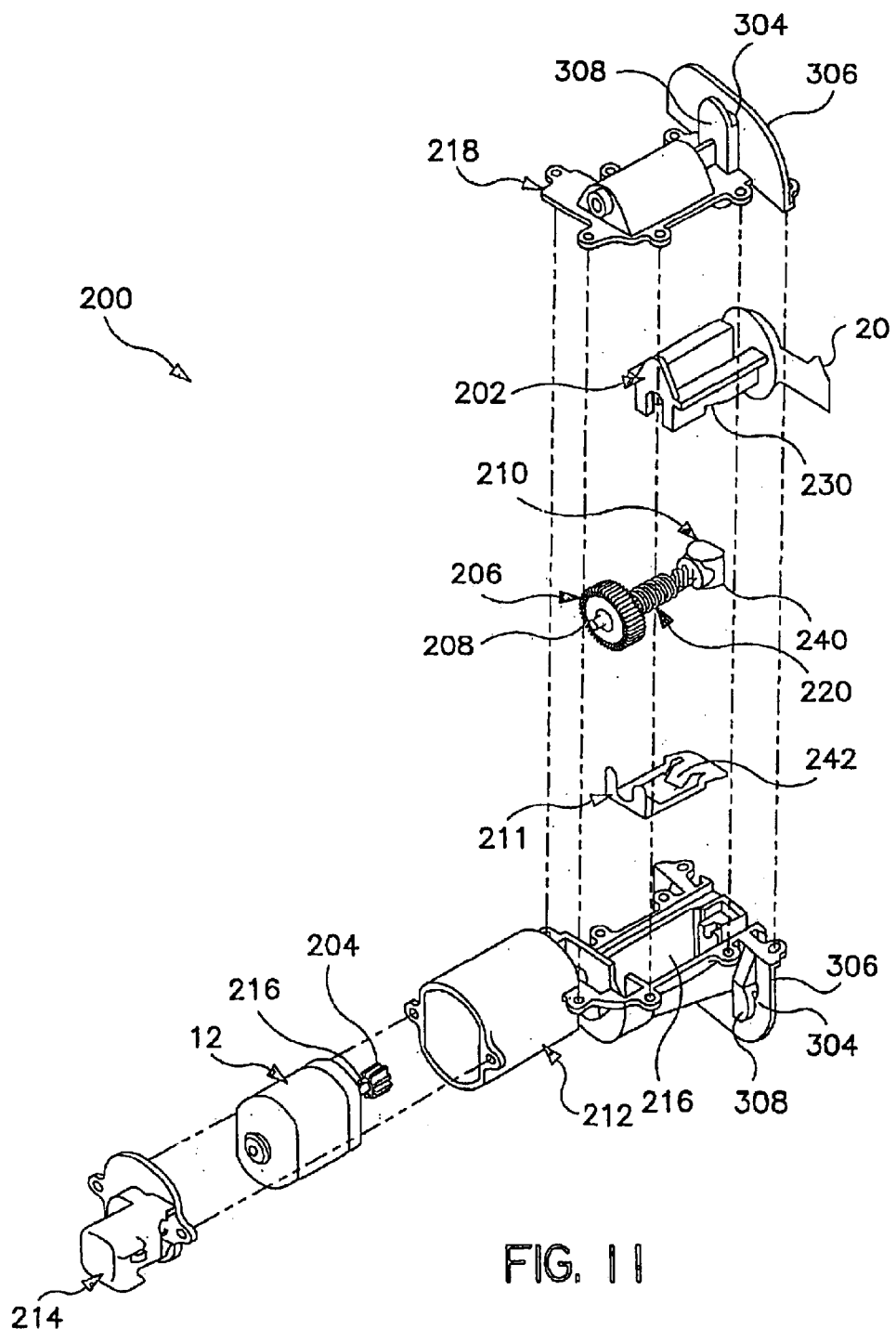
FIG. 11: is an exploded view of another exemplary actuator consistent with the invention.

Another exemplary embodiment 10b of an actuator consistent with the invention is illustrated in FIGS. 8–9. As shown, the rack 34b includes a cam race 120 that receives a pin 122 on the spur gear 28b. Engagement of the pin with portions of the cam race causes linear motion of the rack to achieve the "locked" and "unlocked" positions. Those skilled in the art will recognize that a several cam race configurations may be utilized. In the illustrated embodiment, the cam race 120 is configured generally in the shape of the numeral "7" (seven) with additional cam surfaces.

In the "unlocked" position illustrated in FIG. 8, the pin 122 is disposed in a top right side corner of the cam race with the spring 42 biasing the pin therein. To move to the "locked" position, the motor is operated to rotate the spur gear in a clockwise direction. The pin thus contacts the side surface 124 of the cam race and forces the rack in a direction toward the latch. A leaf spring 41 disposed on the housing biases the rack downward relative to the illustration in FIG. 8. The latch is returned to the "unlocked position" by operating the motor to rotate the spur gear in a counterclockwise direction.

The manual override cable 60 may be used in the manner described above to return the actuator 10b to an "unlocked" condition from a "locked" condition in the event of a power loss. In operation of the manual override, the rack may be drawn in a direction away from the latch arm with the pin 122 riding into the top left hand corner of the cam race, e.g. position A illustrated in FIG. 8.

Turning now to FIGS. 10A–10F, there is shown constituent parts of an exemplary push—push mechanism 22 (FIG. 2) useful in connection with the present invention. FIG. 10A is a top view of the housing portion 140 illustrated in sectional view in FIG. 10F with a compression spring 142. A contact portion 144 of the mechanism illustrated in sectional view in FIG. 10D and in top view in FIG. 10E is disposed within the housing portion with the post 146 extending outward from the top 148 of the housing portion. An inner portion 150 illustrated in side view in FIG. 10B and in top view in FIG. 10C is disposed within the housing portion 140 and against the contact portion 144.

Operationally, when the contact portion 144 is depressed by contact with the post 146 at the exterior of the housing, engagement of the inner portion 150 with slots 160 formed in the housing causes rotation of the inner portion 150 and corresponding movement of tabs 162 on the inner portion into successive ones of the slots 160. The slots on the housing may be of alternating long and short lengths so that alternate actuation of the mechanism achieves closed and open positioning thereof, as occurs for example in a ball point pen.

FIGS. 11–15 illustrate another exemplary embodiment 200 of an actuator consistent with the invention. The illustrated exemplary embodiment 200 includes a motor 12 closed within a housing 212 by an end cap 214. The motor drives a slider 202 through a compound screw 206 and nut 210 arrangement. The slider 202 is biased against the nut by a compression spring 220. A spring loaded catch 211 detents the slider 202 in an unlocked position. The compound screw 206, nut 210, catch 211, and a portion of the slider 202 may be closed in a portion 216 of the housing 212 by a cover 218.

In general, the actuator 200 provides a "door lock" condition by extending the spring-loaded slider 202 that engages with a striker feature on the fuel filler door. In one embodiment, the slider 202 will retract no more than about 0.25 inches and still extend via the spring 220 assuring the fuel filler door will be able to be shut and locked when the actuator has been powered into the "door lock" position when the fuel filler door is in the open position. The normal unlocking operation of the actuator 200 retracts the slider until a detent established by mating of a retracting lock feature 230 on the slider and the catch holds the slider in the retracted position.

Figure 12:
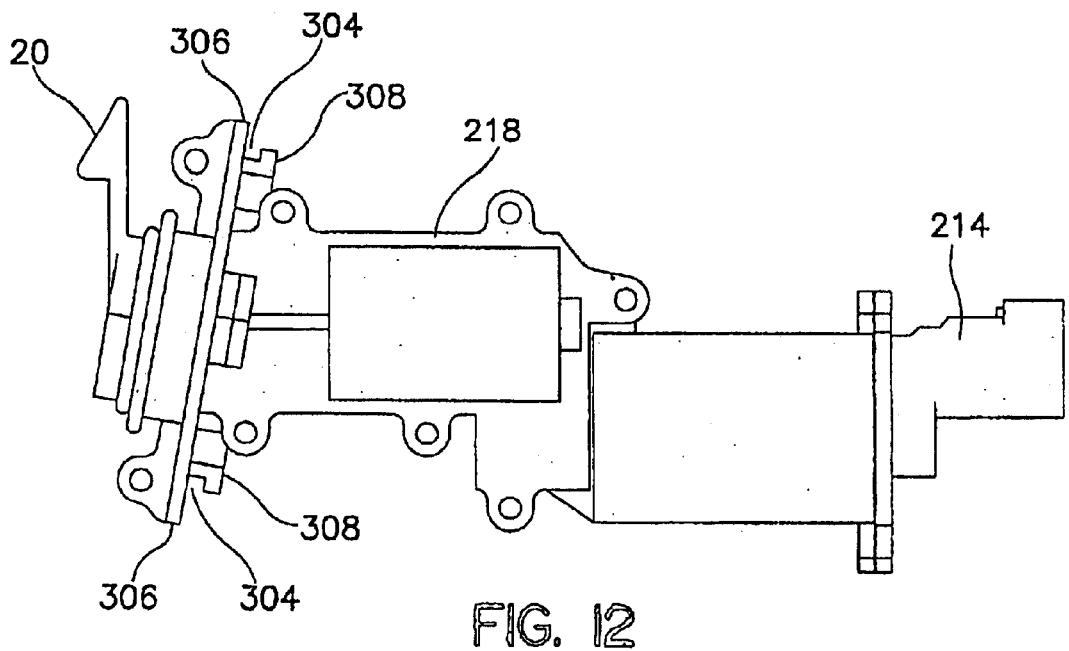
FIG. 12: is a side view of the exemplary actuator illustrated in FIG. 11 shown in an "unlocked condition"
Figure 13:
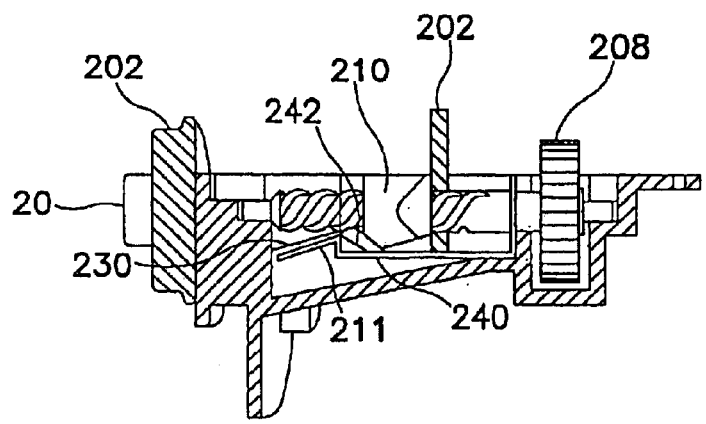
FIG. 13: is a sectional view of a portion of the exemplary actuator illustrated in FIG. 11 shown in an "unlocked condition"

FIGS. 12 and 13 illustrate the actuator 200 in the unlocked position. FIG. 13 illustrates a portion of the actuator including the compound screw, the nut, the catch and a portion of the slider, which is biased against the nut by spring 220. As shown, in the unlock condition, the catch 211 is mated with the retracting lock feature 230, e.g. a notch, in the slider 202, and a forward cam surface 240 on the nut is disposed adjacent a corresponding cam surface 242 of the catch 211. The catch 211 acts as a locking cam to resist movement of the slider 202 to the locking position through mating of the retracting lock feature 230 and the catch 211.

Figure 14:
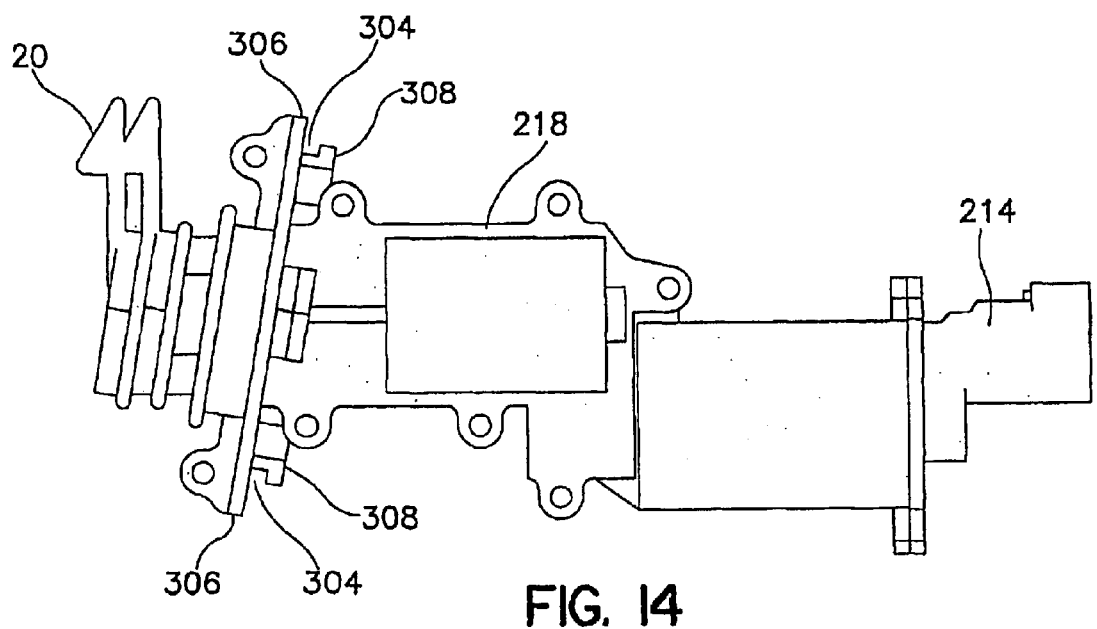
FIG. 14: is a side view of the exemplary actuator illustrated in FIG. 11 shown in a "locked condition"
Figure 15:
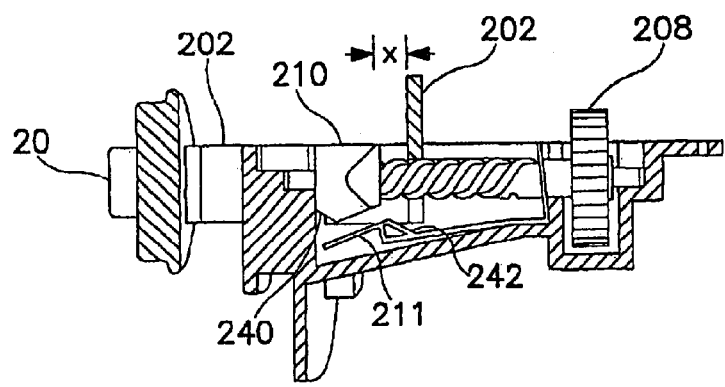
FIG. 15: is a sectional view of a portion of the exemplary actuator illustrated in FIG. 11 shown in a "locked condition."

In moving to the locked condition, as shown in FIGS. 14 and 15, pinion 204 on the output shaft 26 of motor 12 meshingly engages a spur portion 208 of the compound screw 206. The screw 206 drives the nut 210 in a linear motion. Engagement of the cam surface 240 on the nut and the cam surface 242 on the catch under the force of the motor causes the nut to travel over the spring catch 211. As the nut travels across the catch 211, the catch 211 pivots downward. As the catch rotates down, it disengages the retracting lock feature 230 of the slider, which then causes the spring 220 to drive the slider latch 202 outward enabling the "door lock" position. As illustrated in FIG. 15, the slider has a range of motion x such that when the actuator is in the "door locked" position the striker on the fuel filler door will not cause sufficient linear motion to move the slider into the "latched" position. To return to the locked condition, the nut 210 is driven in the opposite direction, pulling the slider 202 until mating of the retracting lock feature 230 and the catch 211 holds the slider in the retracted position. The override function the same as in other embodiments describe previously.

Figure 16A:
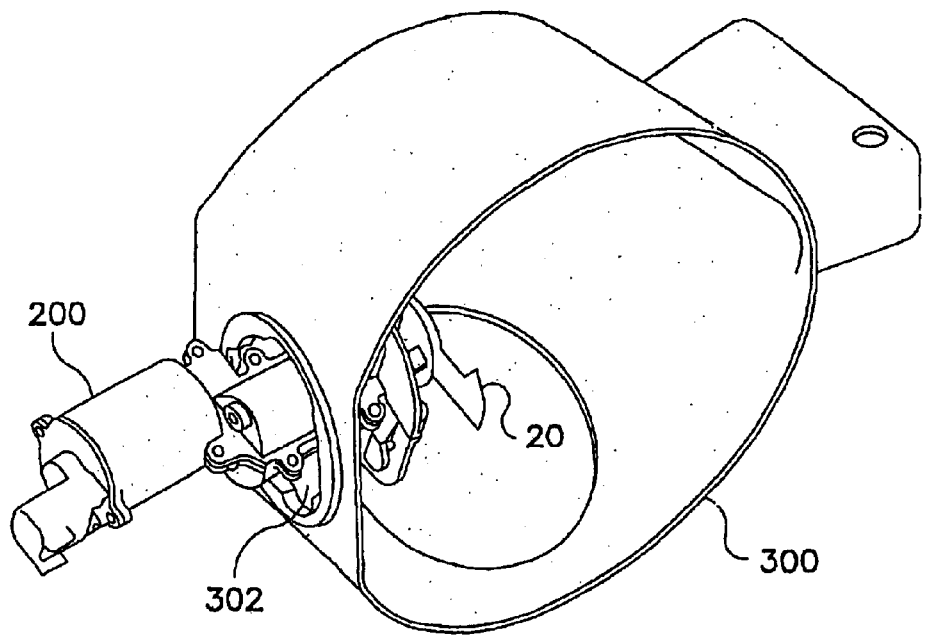
FIGS. 16A–B illustrate an exemplary actuator consistent with the invention in first and second orientations, respectively, relative to a fuel filler door housing showing an exemplary quick connect/disconnect feature consistent with the invention.
Figure 16B:
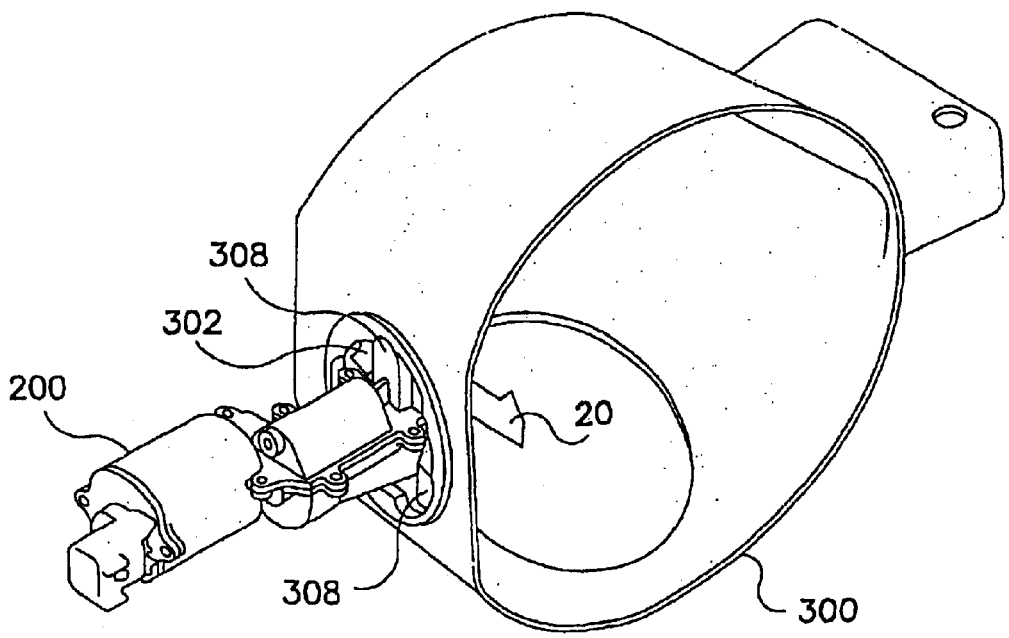

Advantageously, as shown in FIGS. 16A and 16B, the actuator 200 may be configured to provide a "quick connect/disconnect" feature whereby the actuator may be installed into a vehicle from inside the fuel filler housing 300, thus making installation easier and more cost effective. This feature may be implemented by arrangement of the actuator elements so that they will fit through an opening 302 provided for the actuator from the inside. As shown also for example in FIGS. 11, 12, and 14, the actuator housing 12 may be configured to provide one or more grooves 304 between a flange 306 and one or more locking tabs 308.

Once the housing is inserted through the opening 302, actuator may be secured to the fuel filler door housing by rotation of the actuator 200 until the fuel filler door 300 housing is trapped in the groove or grooves 304 between the locking tabs 308 and the flange 306. This may be accomplished by keying the opening 302 of the fuel filler door housing to receive the actuator housing in a first orientation, as shown for example in FIG. 16A, and to then engage the groove or grooves 304 upon rotation, e.g. 20 degrees, of the housing to a second orientation, as shown for example in FIG. 16B.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A fuel filler door actuator comprising:
    a motor;
    a gear train coupled to said motor for moving a latch arm between locked and unlocked conditions; and
    a locking configured to resist movement of said latch arm from said unlocked condition to said locked condition, wherein said gear train comprises a rack and wherein said rack has a first surface with at least one tooth thereon and a second surface opposing said first surface, said second surface having a notch therein positioned to receive said locking cam in said unlocked condition, and wherein said rack is configured to pivot about a pivot point upon engagement and disengagement of said rack with said locking cam.

2. A fuel filler door actuator according to claim 1, wherein said actuator further comprises a compression spring configured to bias said latch arm in said locked condition.

3. A fuel filler door actuator according to claim 1, wherein said rack includes a plurality of teeth on said first surface and wherein said plurality of teeth meshingly engage a spur gear of said gear train.

4. A fuel filler door actuator according to claim 3, wherein said spur gear comprises a first gear of a compound gear, and wherein a second member of said compound gear is in meshing engagement with a motor pinion coupled directly to an output shaft of said motor.

5. A fuel filler door actuator according to claim 3, wherein a diametrical centerline of said spur gear is disposed between said latch arm and said pivot point.

6. A fuel filler door actuator according to claim 1, wherein said actuator further comprises a spring positioned to bias said rack against said locking cam.

7. A fuel filler door actuator according to claim 6, wherein said spring is a leaf spring.

8. A fuel filler door actuator according to claim 1, said actuator further comprising a manual override cable coupled to said rack for manually moving said latch arm from said locked condition to said unlocked condition.

9. A fuel filler door actuator according to claim 1, said actuator further comprising a push/push mechanism responsive to said latch arm.

10. A fuel filler door actuator according to claim 1, wherein said notch comprises a snap leg having a first end affixed to said rack and an unattached second end.

11. A fuel filler door actuator according to claim 1, wherein a gear of said gear train comprises a paddle for engaging said at least one tooth.

12. A fuel filler door actuator comprising:
    a motor;
    a gear train coupled to said motor for moving a latch arm between locked and unlocked conditions,
    a locking cam configured to resist movement of said latch arm from said unlocked conditions to said locked conditions, said gear train comprising a rack, said rack having a first surface with at least one tooth thereon and a second surface opposing said first surface, said second surface further having a notch therein positioned to receive a locking cam in said unlocked condition said rack being configured to pivot about a pivot point upon movement of said latch arm from said unlocked condition to said locked condition;
    a compression spring configured to bias said latch arm to said locking condition; and
    a bias spring positioned for biasing said rack against said locking cam in said unlocked condition.

13. A fuel filler door actuator according to claim 12, wherein said rack includes a plurality of teeth on said first surface thereof, and wherein said plurality of teeth meshingly engage a spur gear of said gear train.

14. A fuel filler door actuator according to claim 13, wherein said spur gear comprises a first gear of a compound gear, and wherein a second member of said compound gear is in meshing engagement with a motor pinion coupled directly to an output shaft of said motor.

15. A fuel filler door actuator according to claim 13, wherein said a diametrical centerline of said spur gear is disposed between said latch arm and said pivot point.

16. A fuel filler door actuator according to claim 13, said actuator further comprising a push/push mechanism responsive to said latch arm.

17. A fuel filler door actuator according to claim 13, said actuator further comprising a manual override cable coupled to said rack for manually moving latch arm from said locked condition to said unlocked condition.

* * * * *

UNITED STATES PATENT AND TRADEMARK OFFICE
Certificate

Patent No. 6,739,633 B2                                                             Patented: May 25, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: John C. Holloway, Cumberland, RI (US); Thomas P. Schregardus, Somerville, MA (US); Henry C. Ruff, Mattapan, MA (US); Eric C. Beishline, Marlborough, MA (US); and William J. Farmer, Westford, MA (US).

Signed and Sealed this Twentieth Day of November 2007.

*JENNIFER H. GAY*
*Supervisory Patent Examiner*
Art Unit 3676